United States Patent
Assarpour et al.

(10) Patent No.: US 9,451,056 B2
(45) Date of Patent: Sep. 20, 2016

(54) METHOD FOR MAPPING PACKETS TO NETWORK VIRTUALIZATION INSTANCES

(75) Inventors: Hamid Assarpour, Arlington, MA (US); Marten Terpstra, Groton, MA (US)

(73) Assignee: Avaya Inc., Basking Ridge, NJ (US)

( * ) Notice: Subject to any disclaimer, the term of this patent is extended or adjusted under 35 U.S.C. 154(b) by 455 days.

(21) Appl. No.: 13/539,276

(22) Filed: Jun. 29, 2012

(65) Prior Publication Data
US 2014/0003434 A1 Jan. 2, 2014

(51) Int. Cl.
  *H04L 12/28* (2006.01)
  *H04L 29/06* (2006.01)
  *H04L 29/08* (2006.01)
  *H04L 12/26* (2006.01)

(52) U.S. Cl.
  CPC ............ *H04L 69/22* (2013.01); *H04L 43/026* (2013.01); *H04L 69/321* (2013.01); *H04L 69/324* (2013.01)

(58) Field of Classification Search
  USPC ............................................. 370/329, 395.53
  See application file for complete search history.

(56) References Cited

U.S. PATENT DOCUMENTS

| | | | |
|---|---|---|---|
| 2002/0145981 A1* | 10/2002 | Klinker et al. | 370/244 |
| 2005/0185647 A1* | 8/2005 | Rao | H04L 12/4641 370/392 |
| 2006/0165103 A1* | 7/2006 | Trudeau et al. | 370/401 |
| 2007/0147363 A1* | 6/2007 | Oswal et al. | 370/389 |
| 2007/0283014 A1* | 12/2007 | Shinomiya et al. | 709/225 |
| 2008/0112403 A1* | 5/2008 | Larsen et al. | 370/389 |
| 2008/0155676 A1* | 6/2008 | Johnson et al. | 726/13 |
| 2008/0170573 A1* | 7/2008 | Ould-Brahim | 370/392 |
| 2008/0172497 A1* | 7/2008 | Mohan | H04L 12/4616 709/249 |
| 2009/0141703 A1* | 6/2009 | Ghodrat et al. | 370/352 |
| 2010/0098098 A1* | 4/2010 | Daines et al. | 370/401 |
| 2011/0032843 A1* | 2/2011 | Papp et al. | 370/254 |
| 2012/0039332 A1* | 2/2012 | Jackowski et al. | 370/389 |
| 2013/0107887 A1* | 5/2013 | Pearson et al. | 370/401 |
| 2013/0322453 A1* | 12/2013 | Allan | H04L 12/4662 370/395.53 |

OTHER PUBLICATIONS

IEEE, IEEE Standard for Local and metropolitan area networks—Virtual Bridged Local Area Networks Amendment 7: Provider Backbone Bridges (IEEE Std 802.1ah™-2008), Aug. 14, 2008, p. 5.*

* cited by examiner

*Primary Examiner* — Hanh N Nguyen
*Assistant Examiner* — Jose Perez (57) ABSTRACT

An operating system adds an application signature as a tag in a packet header. In one embodiment the tag is inserted as a Q-tag in an Ethernet header. When a network element receives the tagged packet, it uses the tag alone or in combination with one or more additional header fields to map the packet to a network virtualization identifier segregating the application traffic on the network. Services are applied to packets according to network virtualization identifier to enable distributed application of services without requiring network elements to maintain state associated with packet flows.

11 Claims, 5 Drawing Sheets

Legend:
10: Network
12: Network Element
16: End System
18: Application facing interface
20: Network facing interface

METHOD FOR MAPPING PACKETS TO NETWORK VIRTUALIZATION INSTANCES

CROSS-REFERENCE TO RELATED APPLICATIONS

None.

BACKGROUND

1. Field

This application relates to communication networks and, more particularly, to a method for packet marking.

2. Description of the Related Art

Data communication networks may include various switches, nodes, routers, and other devices coupled to and configured to pass data to one another. These devices will be referred to herein as "network elements". Data is communicated through the data communication network by passing protocol data units, such as frames, packets, cells, or segments, between the network elements by utilizing one or more communication links. A particular protocol data unit may be handled by multiple network elements and cross multiple communication links as it travels between its source and its destination over the network.

Applications, such as email applications, instant messaging applications, web browsers, and other applications running on end user devices transmit packets of data on the network. A given end user device may have multiple such applications transmitting data on the network and receiving data from the network. Likewise virtual machines running on servers in a data center may have multiple applications transmitting and receiving data from the network.

Different applications may have different tolerances for latency (delay), jitter (differences between the amount of time it takes individual packets to be transmitted on the network), and packet loss, in connection with transmission of data on the network. To enable these applications to operate correctly, it may be desirable to have the network treat flows of packets from different applications differently.

To enable this to occur, the network elements must be able to identify which packets are associated with which applications. One way to attempt to do this is to have the network elements classify packets into flows and apply services on a per-flow basis. Unfortunately, traffic from a given application may include multiple TCP/UDP sessions where Layers 3 and 4 of the seven layer networking stack are being used for transport control, or multiple HTTP sessions where layer 7 (application layer) is being used to implement transport control. Further, on top of that, the application may encrypt the data being transmitted (layer 7 encryption) and optionally the network itself may implement layer 2 or layer 3 encryption, for example in connection with implementing a Virtual Private Network (VPN).

Additionally, keeping track of flows of data requires the network elements to be stateful—the network elements need to keep track of which flows are associated with particular applications. Designing the network elements to keep state of this nature is expensive from a network element design standpoint. Likewise, requiring the network elements to associate packets with flows in connection with providing services can also increase latency associated with packet forwarding, as the increased processing associated with performing this correlation translates to increased delay in implementing a forwarding decision. Further when the data itself is encrypted, it may not be possible to determine which packet is associated with a particular application, so even if it were possible to maintain state it may not be possible to implement per packet services on the network.

SUMMARY OF THE DISCLOSURE

The following Summary, and the Abstract set forth at the end of this application, are provided herein to introduce some concepts discussed in the Detailed Description below. The Summary and Abstract sections are not comprehensive and are not intended to delineate the scope of protectable subject matter which is set forth by the claims presented below.

An operating system adds an application signature as a tag in a packet header. In one embodiment the tag is inserted as a Q-tag in an Ethernet header. When a network element receives the tagged packet, it uses the tag alone or in combination with one or more additional header fields to map the packet to a network virtualization identifier segregating the application traffic on the network. Services are applied to packets according to network virtualization identifier to enable distributed application of services without requiring network elements to maintain state associated with packet flows.

BRIEF DESCRIPTION OF THE DRAWINGS

Aspects of the present invention are pointed out with particularity in the claims. The following drawings disclose one or more embodiments for purposes of illustration only and are not intended to limit the scope of the invention. In the following drawings, like references indicate similar elements. For purposes of clarity, not every element may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

Figure 1:
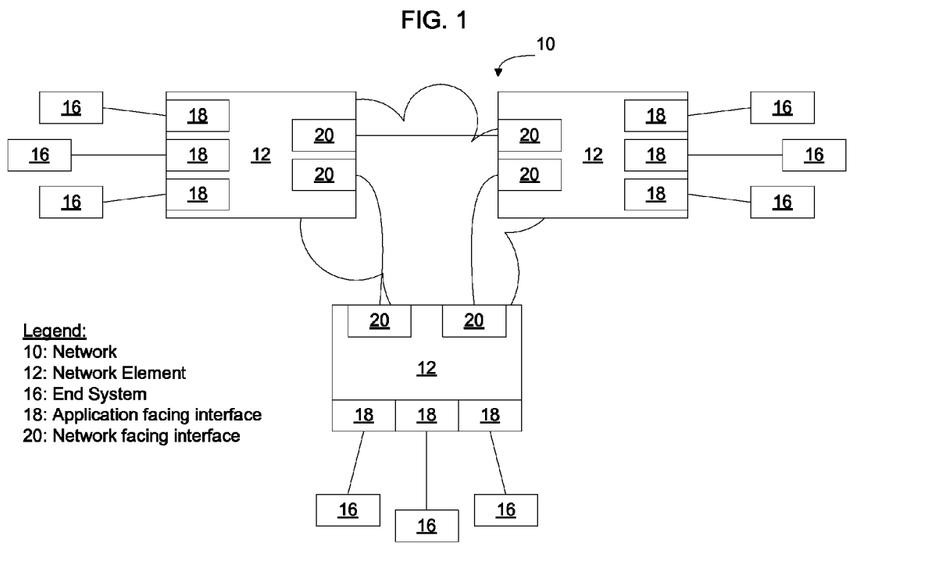
FIG. 1 is a functional block diagram of an example network.

FIG. 1 illustrates an example of a network 10 in which a plurality of network elements 12 such as switches and routers are interconnected to transmit packets of data. Network elements 12 receive packets from end systems 16, process the packets, and forward packets of data toward their destination on the network. End systems 16 include computers (FIG. 3), servers (FIG. 4), or other packet sources. An example network element 12 is discussed in greater detail below in connection with FIG. 2.

Network elements 12, in one embodiment, are access devices configured to implement application facing interfaces 18 interconnecting the network 10 with end systems 16 as well as network facing interfaces 20 interconnecting the network element 12 with other network elements within network 10. The processes described herein for handling packets may be implemented in multiple types of network elements. The network element of FIG. 2 may be used as an edge network element such as an edge router, a core network element such as a router/switch, or as another type of network element. The network element 12 may be implemented on a communication network utilizing one of the Ethernet 802.1 standards, such as 802.1ad, 802.1ah, 802.1Qay, 802.1aq, or other routed Ethernet standard. The network element 12 may also be used in other types of wired/wireless communication networks in which it is desired to provide services to packets on a per-application basis.

Figure 2:
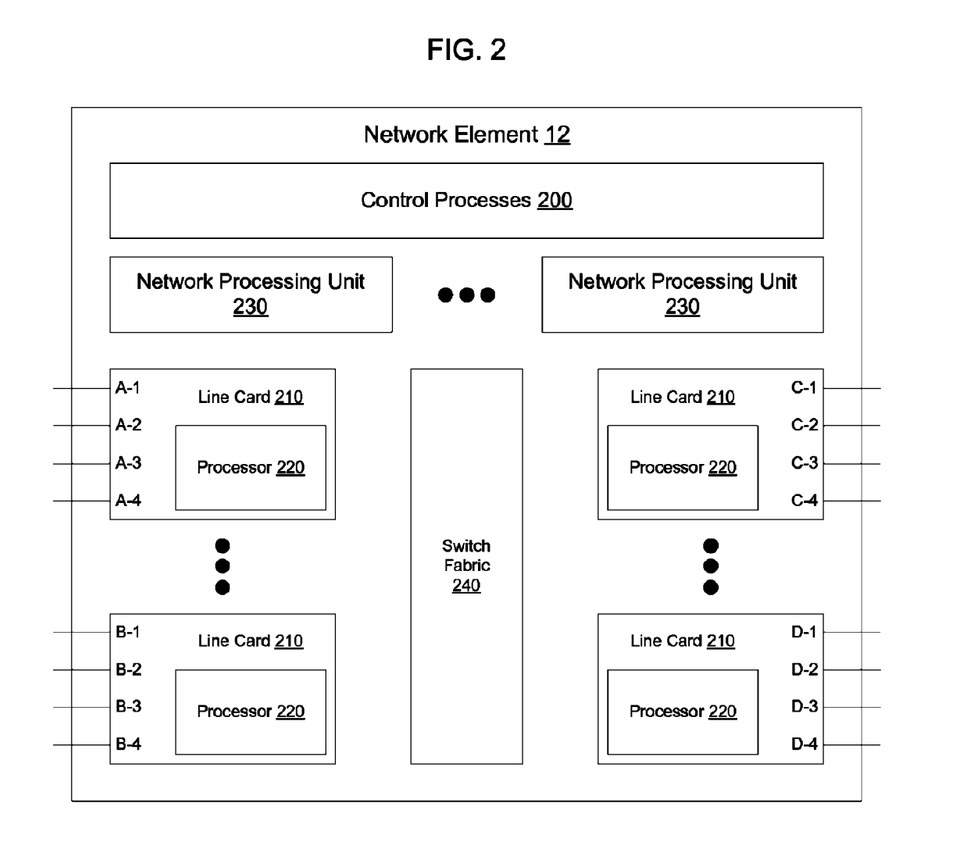
FIG. 2 is a functional block diagram of an example network element.

As shown in FIG. 2, the network element 12 includes one or more control processes 200 to control operation of the network element. Example control processes may include routing processes, network operation administration and management software, an interface creation/management process, and other processes. The particular manner in which the network element is being controlled is not particularly important to understanding operation of the network element on the network and, accordingly, has not been treated in excessive detail herein.

The control processes 200 program hardware forming a data plane of the network element to enable the network element to handle the rapid transmission of packets of data. The data plane, in the illustrated embodiment, includes ports (labeled A1-A4, B1-B4, C1-C4, D1-D4) connected to physical media to receive and transmit data. The physical media may include fiber optic cables or electrical wires. Alternatively, the physical media may be implemented as a wireless communication channel, for example using one of the cellular, 802.11 or 802.16 wireless communication standards. In the illustrated example, ports are supported on line cards 210 to facilitate easy port replacement, although other ways of implementing the ports may be used as well.

The line cards 210 have processing capabilities such as a microprocessor 220 or other hardware configured to format the packets, perform pre-classification of the packets, etc. The data plane further includes one or more Network Processing Unit (NPU) 230 and a switch fabric 240. The NPU and switch fabric enable data to be switched between ports to allow the network element to forward network traffic toward its destination on the network.

According to an embodiment, as described in greater detail below, an application tag such as the application tag proposed in an IETF Internet Draft entitled Classification of Traffic using Application Tags (draft-jpathra-application-tag-11.txt) is used to enable the operating system to apply an application signature to traffic generated by the application. Other tags may be used as well, to enable the application associated with the packet to be disambiguated by the network elements handling flows of traffic.

In an embodiment, the application creates the application signature and passes the application signature to the operating system. The operating system receives data to be transmitted on the network via a socket, encapsulates the data for transportation on the network, and, as part of the encapsulation process adds the application signature to the packet.

The application signature tag is then used, alone or in connection with additional fields of the packet header, to map the packet to a network virtualization identifier. Example network virtualization identifiers may include Ethernet Virtual Local Area Network ID (VLAN ID or VID), I-component Service Identifier (I-SID), VxLAN (Virtual Extensible Local Area Network), NVGRE (Network Virtualization using Generic Routing Encapsulation), or other network virtualization identifier in use on the network.

Services are then provided on the network at the VID or ISID level to enable distributed individualized services to be provided without requiring the network elements providing the services to be stateful. Specifically, as network elements receive data, the network elements will determine the network virtualization identifier and apply services to the packets on a per network virtualization identifier basis. Accordingly, determining a set of services collapses to determining a network virtualization identifier, and network aware services may be provided despite the use of L3/L4 or L7 encryption. Example services include distributed stateless firewall services, in which individual ports on network elements throughout the network may be used to implement firewall services because of the ability to see all flows based on the network virtualization identifier. Likewise, Quality of Service (QoS), traffic policing and shaping, and traffic re-route may be implemented in a distributed manner by the network elements based on the network virtualization identifier.

Since services are applied based on network virtualization identifier, traffic from multiple applications requiring similar services may be mapped to the same network virtualization identifier. Accordingly, application of services on a per-application basis may be implemented using one network virtualization identifier per set of services rather than one network virtualization identifier per application.

Figure 3:
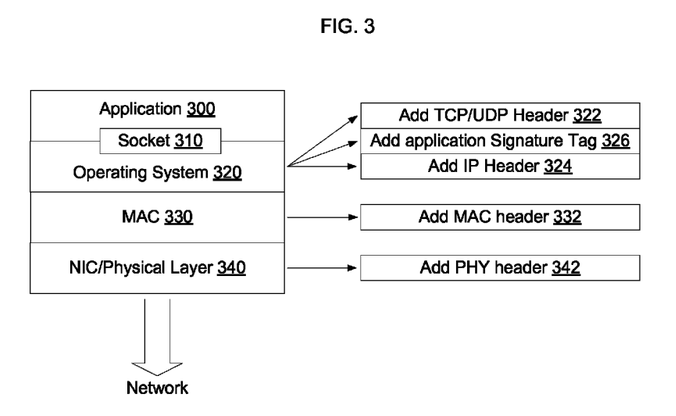
FIGS. 3 and 4 are functional block diagrams showing processing environments of example network elements.

FIG. 3 shows an example end system 16. As shown in FIG. 3, an end system such as a personal computer or other computing device designed to transmit packets on a network typically includes multiple processes which interact with each other to provide data, format the data for transmission, and send the data on the network. In the example shown in FIG. 3, an application 300 running on the end system communicates data to be transmitted on the network via a socket 310 to an operating system 320. The operating system receives the data and divides the data into packets of data to be transmitted on the network. In addition, the operating system is responsible for adding a layer 4 (transport layer) header such as a TCP/UDP header 322 to enable the end systems to enable the transport of the data to be monitored on the network, and also adds a layer 3 (routing layer) header such as an IP header 324 to the packet.

The packetized data is passed to a Media Access Control (MAC) layer which is responsible for adding one or more MAC headers 332 to the packet. According to an embodiment, the operating system also adds an application signature tag 326 to the packet which is added either as a tag in a field of the IP header or which is passed from the OS to the MAC layer and used by the MAC layer to populate a field of the MAC header 332.

Optionally, where the application signature tag 326 is carried as a Q-tag in a MAC header, an Ethertype MAY be defined to indicate the significance of the value carried in that field. For example, an Ethertype may be defined to signal that normal Q-in-Q tagging is not being used and that the Q-tag contains an application signature to allow other nodes on the network to understand that the value carried by the Q-tag is to be used to map the packet to a network virtualization based on the type of services to be applied to the packet. Creation of a particular Ethertype is not a requirement, however.

Figure 5:
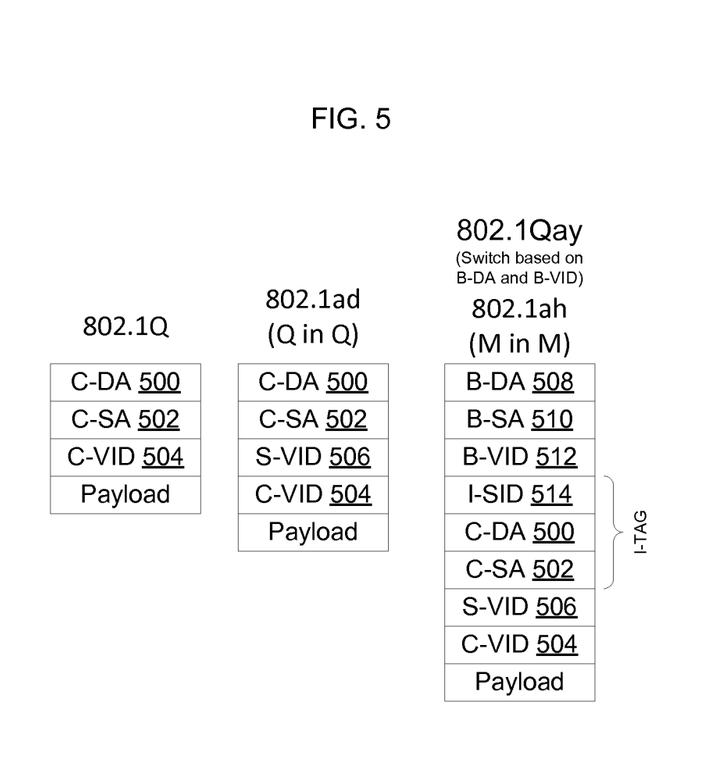
FIG. 5 is a block diagram showing several example header formats for Ethernet frames.

FIG. 5 shows some of the fields of three example MAC header formats. As shown in FIG. 5, a MAC header may include a Customer Destination Address (C-DA) field 500 specifying a destination for the packet, a Customer Source Address (C-SA) field 502 specifying a source of the packet, and one or more Virtual Local Area Network (V-LAN) Identifiers (VIDs). For example, Ethernet standard IEEE 802.1Q enables a customer to add a VLAN tag specifying a customer VLAN using C-VID 504. This VLAN tag is commonly referred to as a Q-tag. Ethernet standard 802.1ad allows two Q-tags to be added to the Ethernet header—a customer VID (C-VID 504) and a provider VID (S-VID 506). Ethernet standard 802.1Qay further adds an additional MAC header including the provider source and destination address fields (B-SA 510 and B-DA 508), provider VID (B-VID) 512, and service identifier (I-SID) 514. The particular standards are quite detailed, and FIG. 5 is merely intended to provide a high level overview of a selection of pertinent fields of Ethernet headers that may be applied to packets of data in connection with forwarding the packets on an Ethernet network.

802.1Q is commonly implemented at end systems 16. 802.1ad and 802.1Qay are more commonly implemented by service providers, such as by an operator of network 10 and would be implemented, for example, at network elements 12. According to an embodiment, an application signature tag 326 identifying the application, application type, or class of application, is added by the operating system to the packet prior to passing the packet to the MAC layer 300. The MAC layer adds the application signature tag as a Q-tag in C-VID field 504 when adding a MAC header as specified in IEEE 802.1Q. In another embodiment, the MAC layer adds the application signature tag as a Q-tag in either the S-VID field 506, or the C-VID field 504 when adding a MAC header as specified in 802.1ad, 802.1Qay, or 802.1ah.

The MAC-encapsulated packet is then passed to the network interface card (NIC) or other physical layer 340 to be forwarded onto the network. The physical layer may add an IEEE 802.3 Ethernet header 342 or otherwise format the packet for transmission on the network. When the packet is received at an application facing interface at network element 12, the application signature tag is used by the network element to map the packet to a network virtualization identifier based on a set of services to be applied to the packet by the network.

Figure 4:
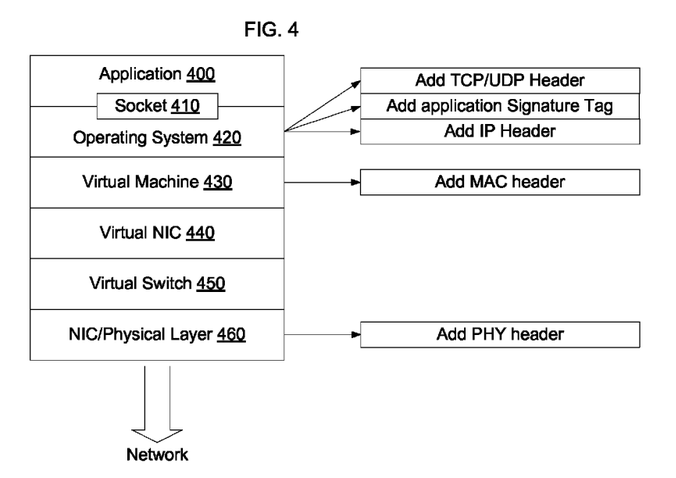

FIG. 4 illustrates another end system which may be implemented, for example, in a data center. In the example shown in FIG. 4, application 400 is communicating with operating system 420 via socket 410. Application 400, operating system 420, and socket 410 collectively form a virtual machine. Hypervisor 430, implementing a virtual machine manager such as VM Ware, is provided to implement hardware virtualization to allow multiple operating systems such as operating system 420 to run concurrently on a host computer.

Hypervisor 430 communicates via virtual Network Interface Card 440 with a virtual switch 450. The virtual switch enables the virtual machines to communicate with each other within the server. Where packets are to be forwarded between virtual machines within the server, the virtual switch receives MAC encapsulated packets and forwards them within the server. Where the packets are to be transmitted outside the server, the virtual switch forwards the packets to a Network Interface Card/physical layer 460 for formatting and forwarding on the network 10.

In the example shown in FIG. 4, the operating system 420, like the operating system 320, adds the TCP/UDP (layer 4) header, the IP (layer 3) header, and the application signature tag. The application signature tag is then used by the MAC layer and added as a Q-tag in either a C-VID or S-VID field depending on the type of MAC forwarding being implemented by the virtual switch. The virtual switch may map the packet to a network virtualization identifier based on a set of services to be applied to the packet by the network, or alternatively this mapping may occur after transmission from the end system shown in FIG. 4 when the packet is received at an application facing interface at network element 12.

Figure 6:
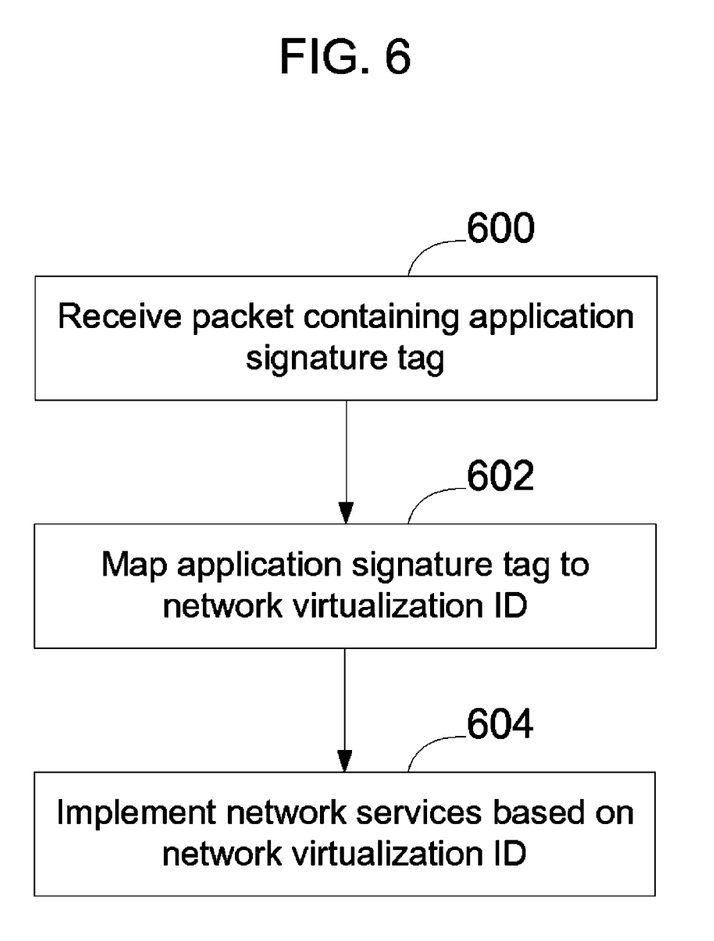
FIG. 6 is a flow diagram of a process according to an embodiment.

FIG. 6 shows a process implemented by network element 12 upon receipt of a packet carrying an application signature tag. As shown in FIG. 6, when a network element receives a packet containing an application signature tag (600), it will use the application signature tag, optionally in connection with one or more fields of the MAC header, to map the packet to a network virtualization instance (602). The network virtualization instance (NVI) may be implemented as a VxLAN, NVGRE, NWID, ISID, or other virtualization instance. Network services are then implemented by network elements in connection with packets of data transmitted on the network according to the network virtualization identifier that has been assigned to the packets (604).

The network virtualization identifier may be selected on a per-application basis, in which a unique network virtualization identifier is assigned to each application.

The network virtualization identifier may be selected on a per-application type basis, in which a unique network virtualization identifier is assigned to each application type. Where network virtualization identifiers are assigned on a per-application type basis, all packets from applications of that type would be assigned to the same network virtualization identifier. For example, all email traffic from email applications would be assigned to the same network virtualization identifier.

The network virtualization identifier may be selected on a per-set of services basis, in which a unique network virtualization identifier is assigned to each set of services that are to be applied to packets. When network virtualization identifiers are assigned based on the set of services to be applied to packets, multiple applications requiring similar services to be applied to packets may have traffic commonly mapped to the same network virtualization identifier. For example, if both Voice and Video telephony have similar latency and jitter requirements, packets from voice applications and video telephony applications may be mapped to the same network virtualization identifier to allow the network to commonly apply services to comply with the latency and jitter requirements for packets associated with the selected network virtualization identifier.

In one embodiment, the application signature tag is used alone to map the packet to a network virtualization instance. In this embodiment, the application signature tag directly specifies to the network the type of services to be provided to packets associated with the application signature tag value. To implement a correct set of services, the network elements on the network establish a network virtualization instance within which the appropriate set of services are provided. For example, an enhanced quality of service may be specified for applications of a particular type. Via a control plane operating on the network, the network elements may be instructed to provide the enhanced quality of service for all packets being transmitted within a particular network virtualization instance. All packets having carrying an identifier of the network virtualization instance within a VLAN ID tag field will be forwarded within the network virtualization instance and provided with this enhanced quality of service.

Likewise, distributed firewall services may be implemented on the network at any port configured to implement forwarding within a network virtualization instance. In this embodiment, packets associated with an application signature tag are mapped, by the network element 12, to a network virtualization instance as they are received at the network. Network elements implement MAC learning within the network virtualization instance as packets are received. If a packet is received with a network destination address that is not resolvable within the network virtualization instance (e.g. via ARP), the packet will be dropped. Similarly, if the packet is received within a source address that is not associated with the network virtualization instance, the packet will be dropped. This allows any port on the network that receives a packet associated with the application signature tag to perform firewall services to prevent rogue traffic from being transmitted within the network virtualization instance. Moreover, state is not required to be implemented to enable the network elements to implement the distributed firewall services. Rather, all network elements simply behave as normal MAC forwarding instances and enable layer 2 MAC forwarding to handle rejection of rogue packets attempting to transit the network with a spoofed or otherwise incorrect application signature tag.

By mapping application signature tags to network virtualization instances, such as VLAN or ISID, network services are able to be provided by network elements at the VLAN or ISID level. Since network elements provide multiple types of services at the VLAN or ISID level, this allows application specific handling to be collapsed to network forwarding, which is easy to implement and straightforward to achieve without significant modification to the deployed infrastructure of network elements. Additionally, network elements commonly are equipped to handle large numbers of network virtualization instances (on the order of thousands), which enables fine grained differentiation between applications at the network level without requiring the network elements to be statefully aware of flows of traffic on the network.

The functions described herein may be embodied as a software program implemented in control logic on a processor on the network element or may be configured as a FPGA or other processing unit on the network element. The control logic in this embodiment may be implemented as a set of program instructions that are stored in a computer readable memory within the network element and executed on a microprocessor on the network element. However, in this embodiment as with the previous embodiments, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, or any other device including any combination thereof. Programmable logic can be fixed temporarily or permanently in a tangible non-transitory computer-readable medium such as a random access memory, cache memory, read-only memory chip, a computer memory, a disk, or other storage medium. All such embodiments are intended to fall within the scope of the present invention.

It should be understood that various changes and modifications of the embodiments shown in the drawings and described herein may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of mapping packets of data to network virtualization instances, the method comprising the steps of:
   creating, by a Media Access Control (MAC) process of an end system, MAC headers for packets of data, at least some of the packets of data being tagged with application signature tags implemented using a field of Internet Protocol (IP) headers of the packets of data, the step of creating MAC headers including a step of mapping the packets of data that are tagged with application signature tags to a set of network virtualization identifiers based on the application signature tags, the set of network virtualization identifiers being implemented using a field of the MAC headers;
   receiving, by a network element, the plurality of packets of data;
   applying sets of network services to the packets based on the network virtualization identifiers, the sets of network services being configured in the network element and associated with network virtualization instances; and
   forwarding, by the network element, the packets of data within the network virtualization instances;
   wherein the step of mapping the packets of data to network virtualization identifiers causes packets from applications requiring the same sets of network services to be forwarded by the network element within the same network virtualization instances.

2. The method of claim 1, wherein the step of mapping uses a combination of fields of the IP headers in addition to the application signature tags.

3. The method of claim 1, wherein the network virtualization identifiers are Virtual Local Area Network Identifiers (VLAN IDs).

4. The method of claim 1, wherein the network virtualization identifiers are I-component Service Identifier (ISIDs).

5. The method of claim 1, wherein the step of applying sets of network services includes applying, by the network element, a specified level of quality of service to packets within the network virtualization instance.

6. The method of claim 5, wherein the specified level of quality of service enables latency for packets within the network virtualization instance to be specified.

7. The method of claim 1, wherein the packets of data include encrypted payload portions, and wherein the step of mapping occurs without reference to data carried within the encrypted payload portions.

8. The method of claim 1, further comprising the steps of receiving, by a second network element, the packets of data within the network virtualization instances and applying, by the second network element the sets of network services to the packets within the network virtualization instances, the sets of network services being configured in the second network element and associated with the network virtualization instances.

9. The method of claim 1, wherein the sets of network services include traffic policing, traffic shaping, and Quality of Service.

10. The method of claim 1, wherein the sets of network services include stateless firewall services.

11. An end system, comprising:
    an operating system;
    two or more applications communicating with the operating system via sockets; and a Media Access Control (MAC) process in communication with the operating system;

wherein the operating system is configured to receive data from the application via the sockets, divide the data into the packets of data, add transport layer headers to the packets of data, add routing layer headers to the packets of data, and pass application signature tags for the packets of data to the MAC process, the application signature tags being based on identities of the applications from which the data was received; and wherein the MAC process is configured to receive the packets of data from the operating system, apply MAC headers to the packets of data, and in connection with applying the MAC headers to the packets of data, map the packets of data to network virtualization identifiers based on the application signature tags and sets of network services to be applied to the packets, the MAC process being further configured to insert as Q-tags in the MAC headers, values associated with the application signature tags received from the Operating System, the Q-tags identifying network virtualization instances on the network within which the sets of network services will be applied to the packets of data.

* * * * *